United States Patent [19]

Leib et al.

[11] Patent Number: 4,993,809
[45] Date of Patent: Feb. 19, 1991

[54] MOUNTING FIXTURE FOR AN OPTICAL INSTRUMENT

[75] Inventors: Kenneth G. Leib, Wantagh; Edward V. Sullivan, Huntington Station; Ronald H. Heuer, Miller Place, all of N.Y.

[73] Assignee: Grumman Aerospace Corporation, Bethpage, N.Y.

[21] Appl. No.: 255,047

[22] Filed: Oct. 7, 1988

[51] Int. Cl.$^5$ .......................... G02B 27/00; G02B 7/02
[52] U.S. Cl. .................................... 350/321; 350/247; 350/3.6; 350/3.85; 356/71
[58] Field of Search ............... 350/321, 252, 247, 245, 350/257, 3.6, 3.68, 3.72, 3.82, 3.83, 3.85; 364/559; 356/71, 104, 400

[56] References Cited

U.S. PATENT DOCUMENTS

| | | |
|---|---|---|
| 2,493,770 | 1/1950 | Manning . |
| 3,359,849 | 12/1967 | Friedman . |
| 3,428,387 | 2/1969 | Hall et al. . |
| 3,433,569 | 3/1969 | Francis . |
| 3,455,026 | 7/1969 | Brault . |
| 3,508,806 | 4/1970 | Hall . |
| 3,511,462 | 5/1970 | Dousseau de Bazignan . |
| 3,541,338 | 11/1970 | Duda et al. . |
| 3,572,888 | 3/1971 | Kawashima . |
| 3,720,849 | 3/1973 | Bardocz . |
| 3,857,643 | 12/1974 | Bardocz . |
| 3,989,358 | 11/1976 | Melmoth ............................ 350/247 |
| 4,012,112 | 3/1977 | Masterson . |
| 4,013,280 | 3/1977 | Chitayat et al. . |
| 4,099,852 | 7/1978 | Kobierecki et al. ................ 350/247 |
| 4,627,009 | 12/1986 | Holmes et al. ....................... 364/559 |
| 4,655,548 | 4/1987 | Jue ....................................... 350/245 |
| 4,676,630 | 6/1987 | Matsushita et al. ................... 355/53 |
| 4,676,649 | 6/1987 | Phillips ................................. 356/401 |
| 4,690,507 | 9/1987 | Zimmermann ....................... 350/321 |
| 4,693,600 | 9/1987 | Cross et al. .......................... 356/121 |
| 4,712,851 | 12/1987 | Fusek et al. ........................... 350/3.6 |
| 4,764,791 | 8/1988 | Omata et al. .......................... 355/26 |
| 4,802,758 | 2/1989 | Fabbiani .............................. 356/71 |

FOREIGN PATENT DOCUMENTS

0237698 9/1987 European Pat. Off. .

Primary Examiner—Bruce Y. Arnold
Assistant Examiner—Loha Ben
Attorney, Agent, or Firm—Scully, Scott, Murphy & Presser

[57] ABSTRACT

A mounting fixture for an optical instrument, such as an optical correlator, providing for the precise mounting and positional adjustment therein of an element, such as a multiple holographic lens, at least along two transverse x and y axes, and also rotationally along θ in roll about the z axis, γ in pitch about the x axis, and β in yaw about the y axis. The mounting fixture enables the holographic lens plate in an optical correlator to be positionally adjusted and then fixed stably in the optical correlator.

16 Claims, 7 Drawing Sheets

MOUNTING FIXTURE FOR AN OPTICAL INSTRUMENT

BACKGROUND OF THE INVENTION

1. Field of the Invention

The present invention relates generally to a mounting fixture for an optical instrument such as an optical correlator, with the mounting fixture providing for the precise mounting and positional adjustment therein of an element at least along two transverse x and y axes, and also rotationally along $\theta$ in roll about the z axis, $\gamma$ in pitch about the x axis, and $\beta$ in yaw about the y axis.

More particularly, the subject invention pertains to a mounting fixture as described providing for the precise mounting and decoupled positional adjustment of an element, such as a glass plate upon which a multiple holographic lens is recorded, or a multiple matched filter, in an optical correlator. The mounting fixture of the present invention enables precise x and y, and roll, pitch and yaw $(\theta,\gamma,\beta)$ positional adjustments and alignments to be made for an element, and then fixedly mounts the element stably in position in the optical correlator.

2. Discussion of the Prior Art

A matched filter optical correlation system is disclosed in U.S. patent application Ser. No. 814,209, filed Dec. 27, 1985, relative to which the mounting fixture of the present invention was designed and developed. The optical correlation system disclosed therein optically compares an input image with optical information stored in multiple matched filters to provide identification, position, and aspect information about the input image. In one disclosed embodiment, the input image is directed onto a spatial light modulator to spatially modulate a coherent beam of radiation. The spatially modulated radiation beam is directed onto a glass plate having recorded thereon a multiple holographic lens which performs a multiple number of Fourier transformations thereon to obtain an array of a multiple set of Fourier transforms of the spatially modulated radiation beam. A corresponding array of matched filters has the array of Fourier transforms incident thereon, with each matched filter comprising a Fourier transform hologram of a scale or an aspect view of an object of interest. Each matched filter passes an optical signal in dependence upon the degree of correlation of the Fourier transform of the spatially modulated radiation beam with the Fourier transform hologram recorded thereon. An inverse Fourier transform lens receives the optical outputs of the array of matched filters, and performs an inverse Fourier transformation on the optical outputs. A detector detects the inverse Fourier transform of the optical outputs, and produces an electrical output signal representative thereof. This signal is called the correlation signal, and the plane of the signal, the correlation plane.

One problem with this type of optical correlator is that of obtaining a proper and precise positional alignment and mounting of the glass plate having recorded thereon the multiple holographic lens. A typical matched filter optical correlator as described hereinabove is normally initially set or adjusted such that the multiple holographic lens is properly positioned along x and y coordinates and also properly angularly positioned with respect to roll, pitch and yaw $(\theta,\gamma,\beta)$ angular adjustments. The present state of the art of optical correlators has improved to the point that the multiple holographic lens can be designed to be fixed in place and not require a z adjustment along the optical axis. Moreover, it should be pointed out that in the present state of the art, the mounting fixture of the present invention is designed for relatively fine translational and angular adjustments and alignments, not for gross positional alignments. The mounting fixture of the present invention could also be utilized to mount a matched filter or multiple matched filter in the optical correlator, in which case the axial distance along the z axis (optical axis), the $\gamma$, pitch adjustment, and the $\beta$ yaw adjustment are normally initially properly set. Moreover, these adjustments generally remain properly set and aligned in particular embodiments of the optical correlator, and do not require re-adjustment each time a new matched filter is placed therein.

SUMMARY OF THE INVENTION

Accordingly, it is a primary object of the present invention to provide a mounting fixture for an optical instrument such as an optical correlator providing for the precise mounting and positional adjustment therein of an optical element, such as a glass plate having recorded thereon a multiple holographic lens or a multiple matched filter, along transverse x and y axes, and also rotationally $\theta$ in roll about the z axis, $\gamma$ in pitch about the x axis, and $\beta$ in yaw about the y axis, all with decoupled adjustments.

A further object of the present invention is the provision of a mounting fixture which provides the capability to swiftly and accurately align a key optical element in an optical correlator, i.e. the multiple holographic lens.

In accordance with a preferred embodiment, the mounting fixture includes a base member and a track plate rotationally mounted on the base member for rotation about a y axis, and designed to be fixedly secured in a selected rotational position. A cradle is rotationally mounted on the track plate for rotation about a z optical axis of the optical instrument, and is also designed to be fixedly secured in a selected rotational position. An optical element holder, such as a plate holder, is rotationally mounted on the cradle for rotation about an x axis, and is also mounted for x translational movement along the x axis. The optical element holder is designed to be fixedly secured in a selected rotational position, and also in a selected x translational position. An optical element, such as a multiple holographic lens, is mounted on the optical element holder for translational movement along a y axis, and is mounted to be fixedly secured in a selected y translational position.

In accordance with further details of the preferred embodiment, the track plate is rotationally mounted on the base member by an inner central bearing and also by an outer circular bearing. The track plate is fixedly secured to the base member by at least one yaw adjustment set screw. A cradle is rotationally mounted on the track plate by a plurality of roller bearing assemblies, at least two of which move along a $\theta$ roll adjustment track on the track plate. Moreover the cradle is fixedly secured by at least one $\theta$ roll adjustment set screw extending from the track plate to the cradle. The optical element holder is fixedly secured in a selected rotational position by at least one pitch adjustment set screw extending from the cradle to the optical element holder, and the optical element holder is fixedly secured in a selected x translational position by an x translational adjustment set screw extending from the cradle to the optical element holder. The optical element holder is mounted on the cradle by a rotatable and translational pin mounting on one side of the optical element holder, and by the x translational adjustment set screw on the second side of the optical element holder. An optical element such as a glass plate having a multiple holographic lens recorded thereon is mounted in the holder, and is fixedly secured in a selected y translational position by a y translational adjustment set screw extending from the optical element to the optical element holder.

The mounting fixture of the present invention is constructed form a number of interrelated fixture and frame members which are designed for stability while providing for precise positional adjustments of the element mounted therein. The optical correlator, including the mounting fixture, is typically mounted on a stabilized optical bench or table to isolate it from vibrations, etc.

In accordance with the teachings herein, the mounting fixture of the present invention:

1. Provides a hologram plate holder which enables the hologram plate to be precisely aligned and fixed in place for long term service.

2. Provides a fixture which can be used both in laboratory set-ups or in functional and operating optical correlators.

3. Features decoupled roll, pitch and yaw adjustments.

4. Features decoupled x, y and z adjustments.

5. Could easily be automated with electro-mechanical drives such as motorized micrometers if required.

6. Is designed to accept a variety of multiple holographic lens plate sizes, e.g. 2"×2", 2½"×2½", 4"×5", etc.

7. Provides an extremely stable mounting fixture since there are no welded or fastened seams therein.

The mounting fixture of the present invention could be designed in different embodiments to accept electro-mechanical drives, but in an intended optical correlator design, a preferred approach is to use small screwdriver or allen wrench adjustments and then to seal the adjustments with a suitable sealant or glue such as glyptol or an epoxy cement. Any adjustments to be made after the multiple holographic lens is optically aligned are designed to be made at the corresponding multiple matched filter in this particular correlator design. This design results from the fact that the multiple holographic lens is not often replaced in a correlator unless broken, scratched, or otherwise damaged.

BRIEF DESCRIPTION OF THE DRAWINGS

The foregoing objects and advantages of the present invention for a mounting fixture for an optical instrument may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

The present invention relates to a mounting fixture for use in an optical instrument such as an optical correlator as is disclosed and described in U.S. patent application Ser. No. 814,209, filed Dec. 27, 1985, which uses a multiple holographic lens (MHL) — multiple matched filter (MMF) array.

A number of elements and concepts relating to the present invention are used in this description and are essential to an understanding of the functioning and general principles of operation of an optical correlator, and accordingly several of those concepts are discussed initially hereinbelow for convenience.

A holographic lens (HL) is made by recording an interference pattern of an expanding point radiation source and a collimated radiation beam, which produces a hologram of a point source. When the holographic lens (after recording and processing, as on film) is illuminated, it recreates the point source, i.e., it functions as a lens. If the recording process is repeated prior to development of the recording median, a series of point source holograms, or a multiple holographic lens (MHL), is recorded on the photographic medium.

An optical correlator as described herein utilizes one of several possible distributions in offset angle, position and focal length in a multiple holographic lens array to produce an array of Fourier transforms of an input spatially modulated, laser radiation beam. In general, the particular requirements of the array will be determined by the particular application being addressed. In summary, a holographic lens takes a Fourier transform of a laser beam illuminated scene or target, and a multiple holographic lens takes, simultaneously, a multiple set of Fourier transforms. A multiple holographic lens array is normally used in conjunction with a corresponding multiple array of matched filters.

Figure 1:
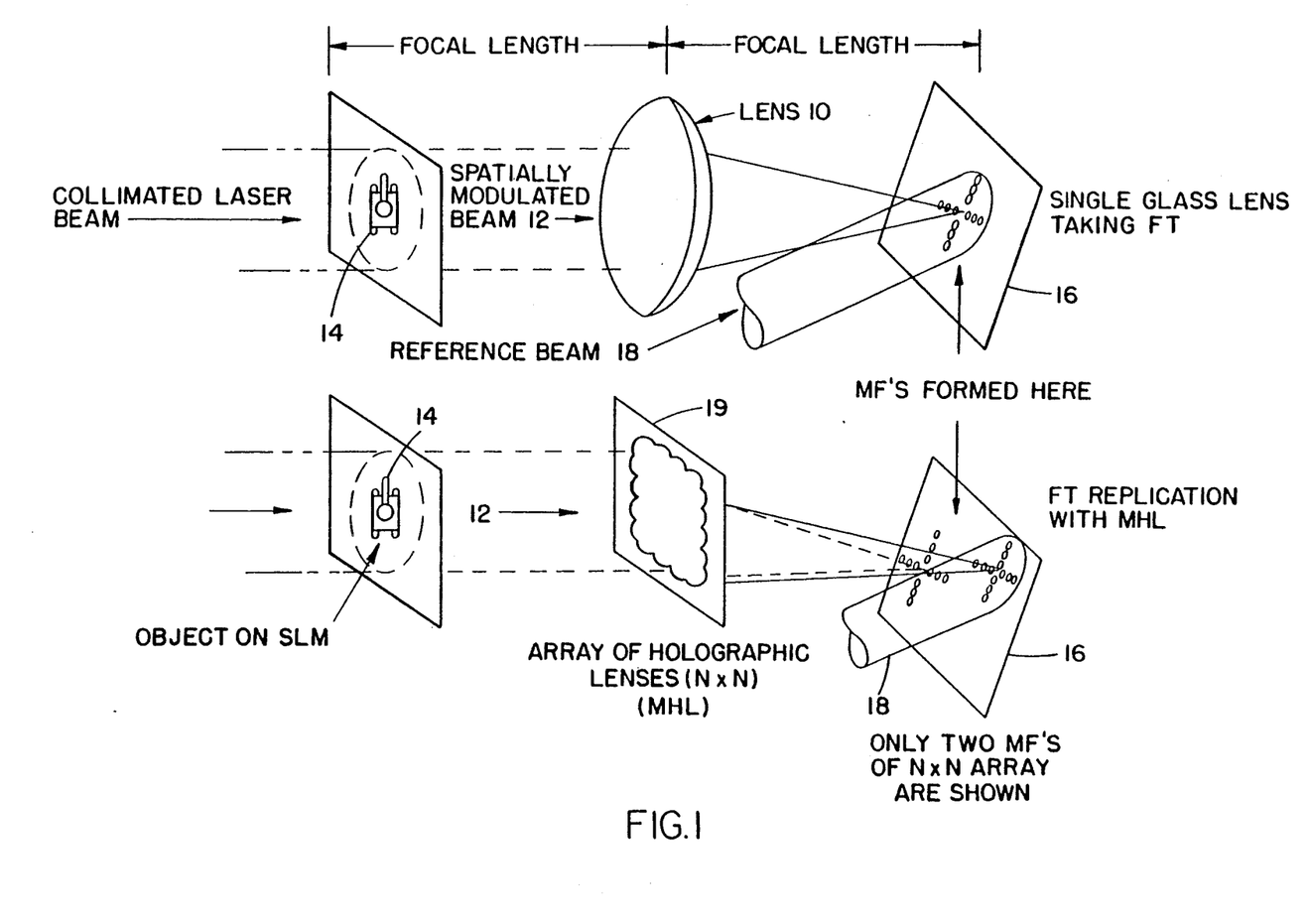
FIG. 1 illustrates in the upper portion thereof a lens taking the Fourier transform of an incident image, which is a basic lens property, and the fabrication of a matched filter therefrom with a reference beam, and in the lower portion thereof a multiple holographic lens forming multiple Fourier transforms of an incident image and the fabrication of a multiple matched filter therefrom with a reference beam.

Referring to FIG. 1, when a lens 10 is illuminated by a spatially modulated collimated beam 12, (as when it is modulated spatially by passing through a recorded image 14 of a scene, target, etc.), the lens creates at its focal point a Fourier transform of the object(s), which can be recorded on a recording medium such as on a film 16, which is a basic lens property. When the Fourier transform is interfered with a collimated (or reference) beam 18 from the same source, an interference pattern results. This is called a Fourier transform hologram, or matched filter (MF), which is an optical spatial filter of the input object. When an arbitrary scene is later played through an optical correlator system employing that matched filter, the matched filter picks out and passes the object for which it was made. The signal passed by the filter is Fourier transformed again, and the optical correlation signal is generated and detected. If the target for which the matched filter is made is present, a sharp correlation signal results, whereas nontarget signals result in broad low base correlation signals. Referring specifically to the lower portion of FIG. 1, when an array of multiple holographic lenses 19 is illuminated by a spatially modulated laser beam, the array of MHL 19 forms in the focal planes thereof on array of Fourier transforms of the object. A collimated reference beam 18 from the same source can be interfered therewith to form an array of Fourier transform holograms or matched filters which can be recorded on a matched filter plate or film 16. The MHL replicates the Fourier Transform (FT), and so instead of one FT, as many FTs can be formed as are present in the MHL array. Before operation, a matched filter (MF) is fabricated at each point corresponding to one of the MHL focal points. This array of MFs constitutes the optical memory of the optical correlator. The MF can be fabricated for many targets, or for many aspects on one target, or for some combination thereof. In operation, all MFs in the array must be aligned for proper operation.

Figure 2:
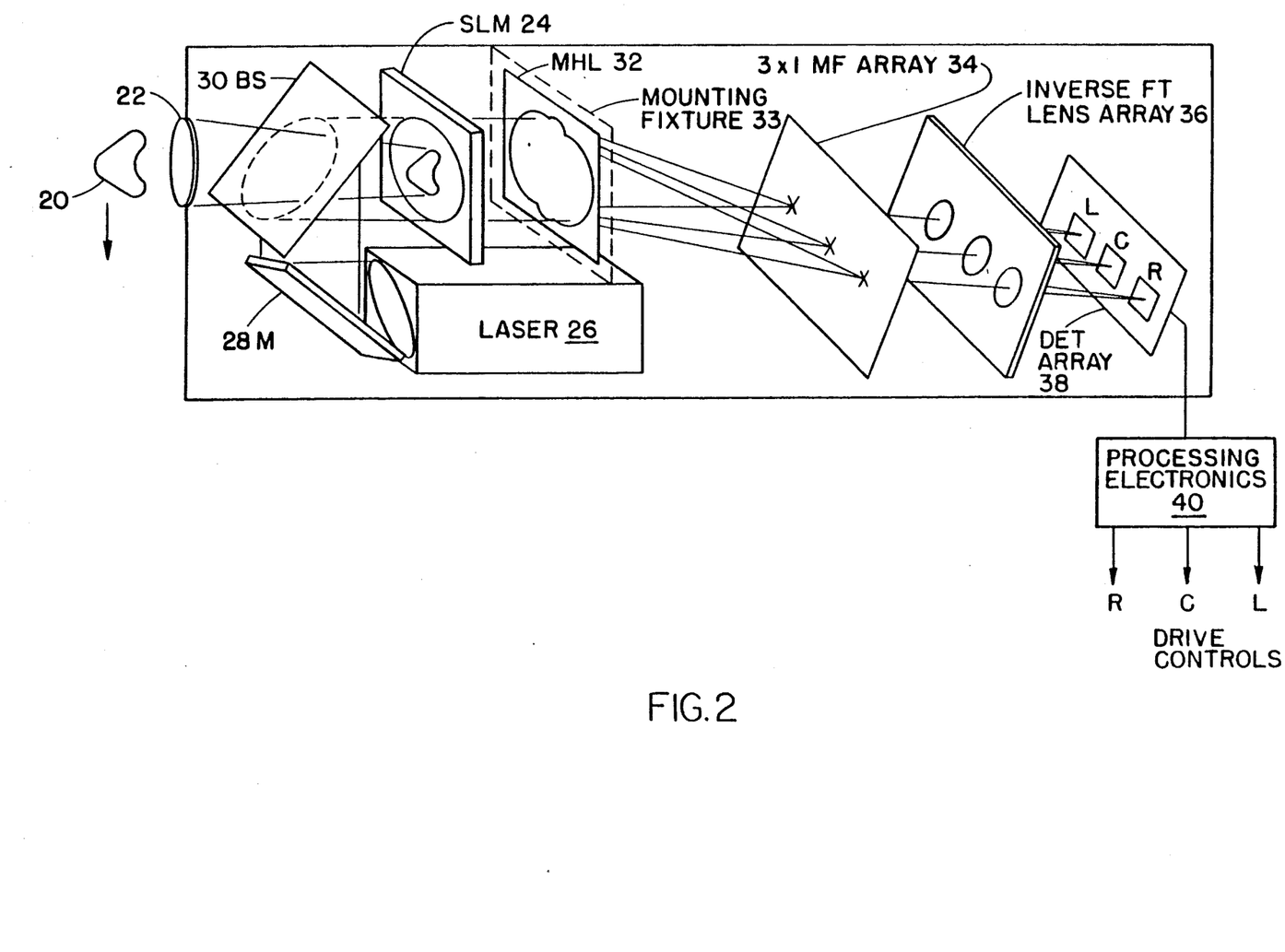
FIG. 2 illustrates a schematic arrangement of an optical correlator employing a multiple matched filter therein as its memory, and in which the alignment fixture of the present invention can be utilized to properly positionally align and mount a multiple holographic lens or other element therein.

FIG. 2 is a schematic arrangement of a typical optical correlator employing a multiple holographic lens and a multiple matched filter array. Referring thereto, an object of interest 20 is positioned at the input to the optical correlator, and is imaged by an input lens 22 onto a spatial light modulator (SLM) 24, which spatially modulates the image onto a laser beam from a laser 26, directed thereto by a mirror 28 and a beam splitter 30. The spatially modulated laser beam is Fourier transformed by a multiple holographic lens 32 and directed onto a corresponding array of multiple matched filters 34. The multiple holographic lens 32 is mounted and positionally adjusted by a mounting fixture 33, shown only schematically in FIG. 2, which can be constructed pursuant to the teachings of the present invention. An inverse Fourier transform lens array 36 inversely Fourier transforms the outputs of the matched filters and directs the outputs thereof onto a detector array 38, the output signals of which can be electronically processed at 40 to produce output control signals.

Figure 3:
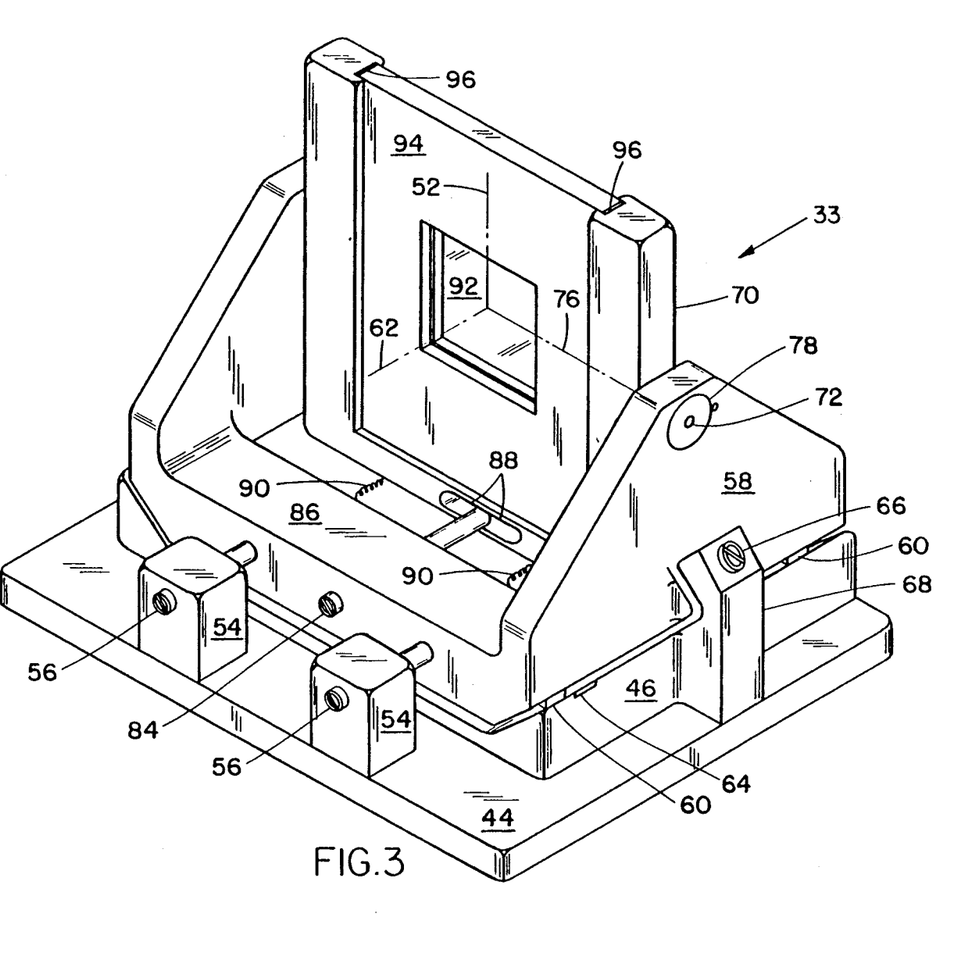
FIGS. 3 and 4 are respectively front and rear perspective views of a first exemplary embodiment of a mounting fixture for an optical correlator constructed pursuant to the teachings of the present invention.
Figure 4:
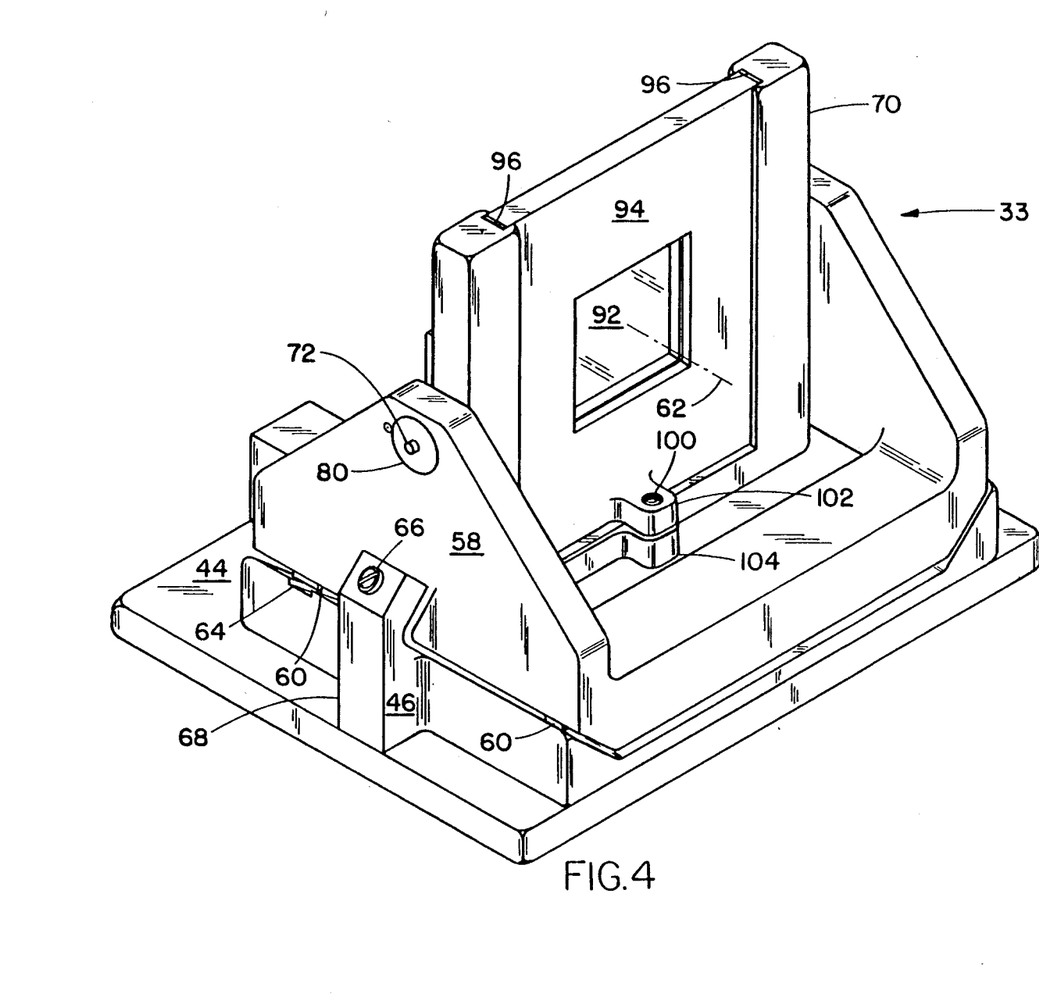
Figure 5:
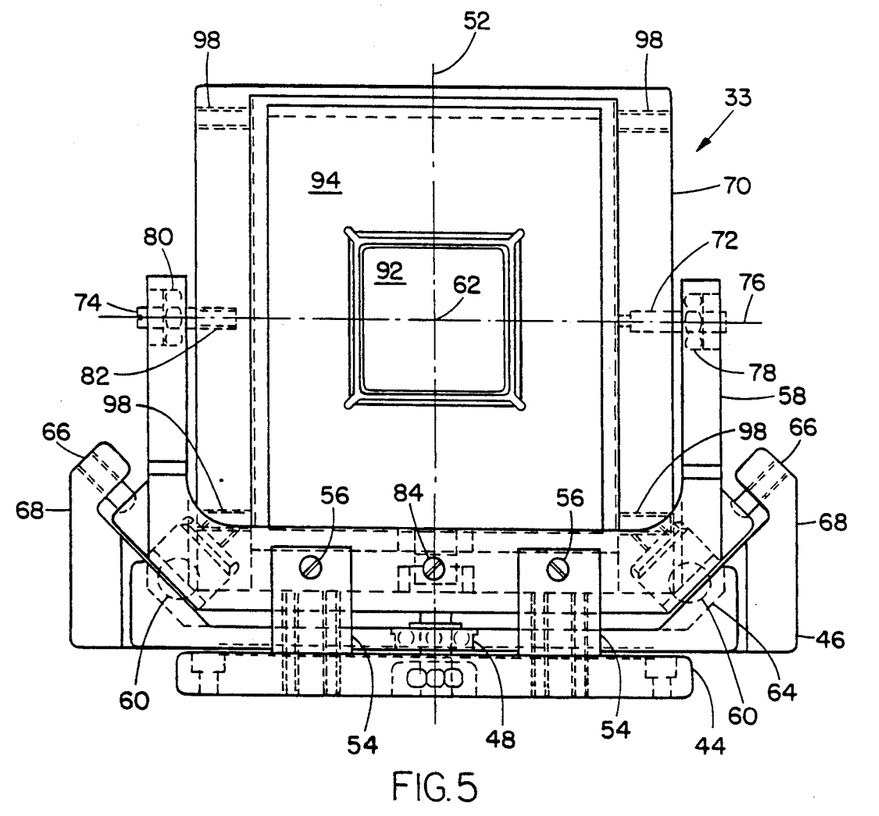
FIG. 5 is a front elevational view of the same exemplary embodiment of a mounting fixture with additional details shown therein.
Figure 6:
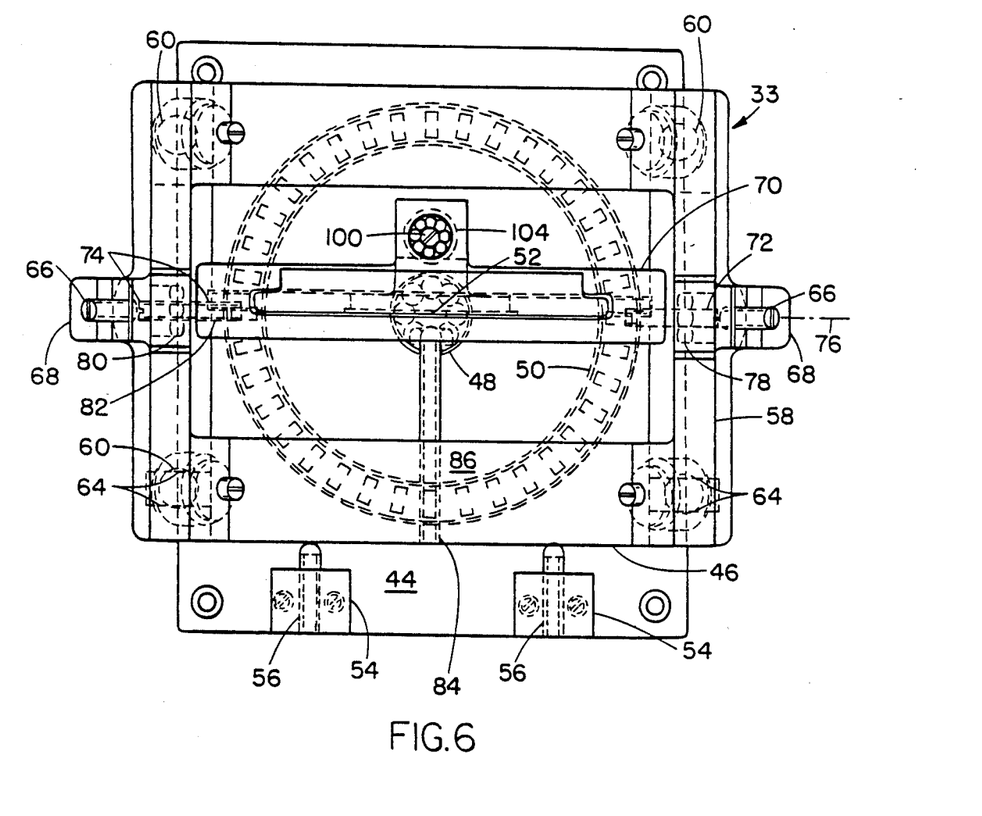
FIG. 6 illustrates a top plan view of the same mounting fixture.
Figure 7:
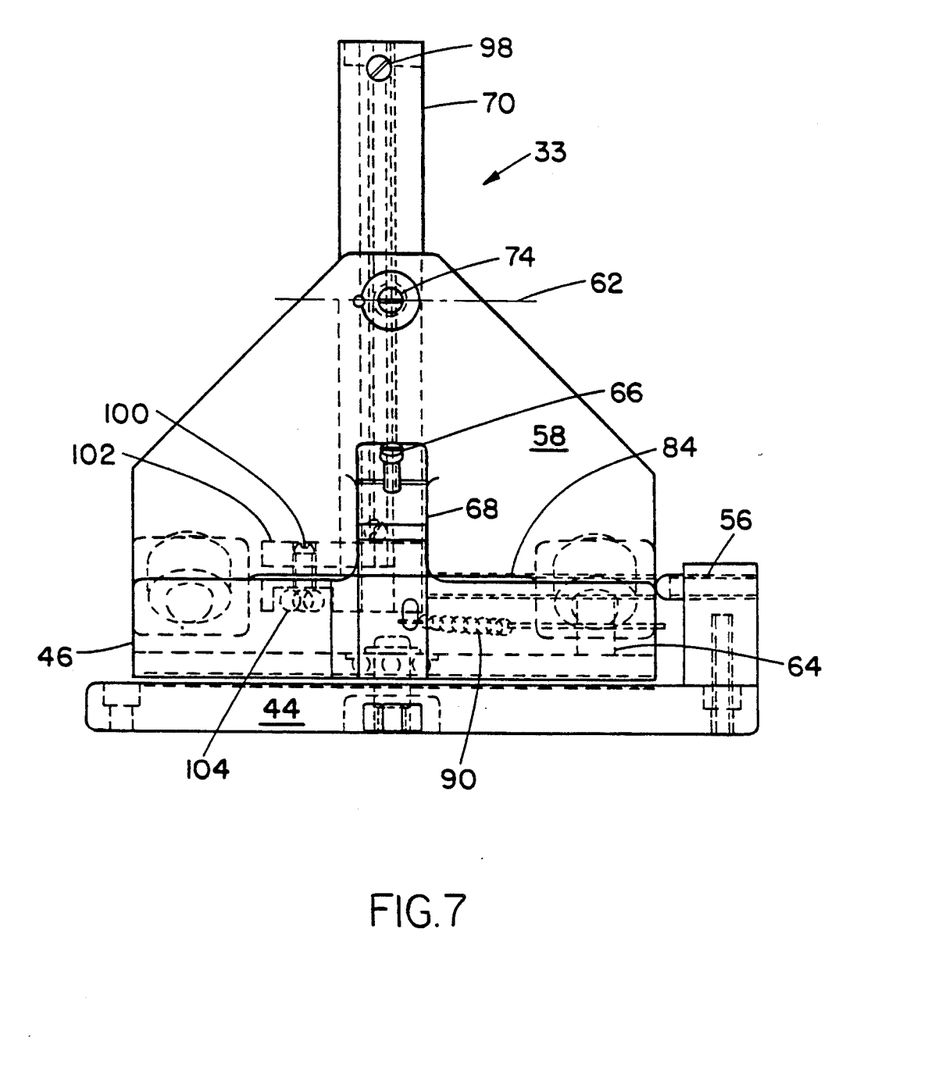
FIG. 7 is a side elevational view of the same mounting fixture.

FIGS. 3 and 4 are respectively a front and rear perspective view of a first exemplary embodiment of a mounting fixture for an optical correlator constructed pursuant to the teachings of the present invention. FIG. 5 is a front elevational view, FIG. 6 a top planview, and FIG. 7 a side elevational view, of the same exemplary embodiment of a mounting fixture with additional details being shown and illustrated in FIG. 5 through 7. The mounting fixture 33 includes a base 44 which can be a track plate as illustrated in FIGS. 3 through 7. The base could also be designed with alignment bosses thereon to mount it on an optical bench or table designed to isolate it from vibrations, etc. The mounting fixture must be fairly precisely positioned relative to the optical correlator, and for that purpose, one or more reference alignment bench rails can be provided on the stabilized optical table. Such alignment bench rails enable the mounting fixture 33 itself to be moved therealong along the z optical axis of the optical correlator to provide a z translational adjustment. However, as mentioned hereinabove, the present state of the art of optical correlators is such that adjustment of the mounting fixture along the z optical axis is not normally required.

A track plate 46 is rotationally mounted onto the base 44 by a central pivot bearing 48 and an outer circular bearing 50 Two yaw adjustment screws 56 are threadedly engaged in upstanding lug projections 54 on the base and bear against a cradle 58 to provide a precise yaw $\beta$ rotational adjustment about a y axis 52.

The cradle 58 is mounted by four bearings 60, resting on precision roll control surfaces on top of the track plate, such that the cradle 58 is rotatable about the optical z axis 62. The forward set of bearings 60 can be positionally guided in a precision groove 64 cut in the upper inner inclined surface of the track plate 46, while the rear set of bearings 60 can rest directly on an inclined surface at the same height. The roll surfaces are at the same height to enable the cradle 58 to turn about the z optical axis 62. Two roll $\theta$ adjustment set screws 66 extend from upstanding projections 68 on the track plate 46 and bear against the cradle 58 to provide a precise roll $\theta$ rotational adjustment about the z axis 62.

An optical element holder 70 is rotationally mounted by a pin 72 and an x adjustment set screw 74 such that the optical element holder 70 pivots about an x axis 76 to provide a $\gamma$ pitch angular adjustment. The pin 72 is rotationally and translationally mounted in a bearing 78, to rotate with the bearing and extends into a pin aperture in the optical holder in which the pin is snugly mounted to support the optical element holder. The set screw 74 is rotationally mounted in a bearing 80, which fixedly secures the screw 74 against movement along the x axis 76. The screw 74 extends into a threaded passage 82 in the optical element holder 70, such that rotation of the set screw 74 results in translational movement of the optical element holder 70 along the x axis 76.

A centrally located $\gamma$ pitch adjustment set screw 84 extends from a forward central section 86 of the cradle 58 and is secured in a threaded passage therein. The set screw 84 projects rearwardly into an elongated (along the x axis) depression 88 in the bottom of the optical element holder 70 and is spring biased thereagainst by a pair of tensioned springs 90 extending from the bottom of the optical element holder 70 forwardly to the central section 86 of the cradle 58. Accordingly, rotation of the adjustment set screw 84 results in a $\gamma$ pitch angular adjustment movement of the optical element holder 70 about the x axis 76. The depression 88 is elongated along the x axis to allow for x translational adjustments by the x translational set screw 74.

The glass plate 92 upon which the multiple holographic lens is recorded is mounted in an adapter plate 94 which slides in a pair of opposed vertical slots 96 in the optical element holder 70. The optical element holder 70 is preferably designed to hold a 4"×5" photo plate. However, using the adapter plate 94, any smaller photo plate, such as a 2"×2" plate 92 as shown, can be secured and held securely therein. In all cases, the plates are positioned at the center of the optical correlator along the optical z axis 62 thereof, and the center of rotation about the y axis 52 is also positioned at the emulsion of the photo plate. The adapter plate 94 is precisely positioned in the optical element holder 70 by four ball plungers 98, one near the top and bottom of each opposed slot 96.

A y translational adjustment screw 100 is threadedly mounted in a rearwardly projecting lug 102 near the bottom of the adapter plate 94, and extends downwardly into a threaded bearing assembly 104 mounted in a rearwardly projecting lug 104 near the bottom of the optical element holder 70. The threaded bearing assembly allows the set screw 100 to rotate, but secures it against movement along the y axis such that rotation of the y translational adjustment set screw 100 results in the y translational movement of the adapter plate 94 in the opposed slots 96.

A significant design feature of the present invention is that all of the x, y and z translational adjustments and all of the θ roll, γ pitch and β yaw rotational adjustments are decoupled. This design feature is achieved by mounting the surface of the glass plate 92 having the multiple holographic lens recorded thereon exactly at the center of the x, y, z coordinate system, and by providing each translational adjustment precisely along an axis of the coordinate system, and by providing each rotational adjustment precisely about an axis of the coordinate system. With such an arrangement, any one of the adjustments provided by the mounting fixture does not adversely affect the remaining alignments and adjustments. In one designed embodiment of the mounting fixture, all screw adjustments were designed with a 0.250-80 TPI thread standard.

The design of the alignment fixture is such that the various components thereof are preferably machined from a unitary block of stress relieved material. This one-piece construction eliminates welded or fastened seams that may weaken or develop flaws and thereby cause variations in the previously established settings. The design also eliminates several subassemblies, and allows for the incorporation of "one-time" adjustments which can be set and permanently locked.

The mounting fixture of the present invention could be designed in different embodiments to accept electromechanical drives, but in an intended optical correlator design, a preferred approach is to use small screwdriver or allen wrench adjustments and then to seal the adjustments with a suitable sealant or glue such as glyptol or an epoxy cement. Any adjustments to be made after the multiple holographic lens is optically aligned are designed to be made at the corresponding multiple matched filter in this particular optical correlator design. In such alternative embodiments, the electromechanical drives could be pulse driven motor micrometers which can control motion to 0.02 micrometer accuracy by electrical driving pulses, such as can be supplied by a microcomputer.

While a preferred embodiment and several variations of the present invention for a mounting fixture for an optical instrument are described in detail herein, it should be apparent that the disclosure and teachings of the present invention will suggest many alternative designs to those skilled in the art.

What is claimed is:

1. A mounting fixture for an optical instrument, providing for a precise mounting and positional adjustment therein of an optical element at least along two transverse x and y axes, and also rotationally along θ in roll about a z optical axis of the optical instrument, γ in pitch about the x axis, and β in yaw about the y axis, comprising:

a. a base member;
    b. a track plate rotationally mounted on said base member for rotation about the y axis, and means for fixedly securing the track plate in a selected rotational position;
    c. a cradle rotationally mounted on said track plate for rotation about the z optical axis, and means for fixedly securing the cradle in a selected rotational position;
    d. an optical element holder rotationally mounted on said cradle for rotation about the x axis, and also for x translational movement along said x axis, means for fixedly securing the optical element holder in a selected rotational position, and means for fixedly securing the optical element holder in a selected x translational position; and
    e. an optical element mounted on said optical element holder for translational movement along said y axis, and means for fixedly securing the optical element in a selected y translational position.

2. A mounting fixture for an optical instrument providing for a precise mounting and positional adjustment therein of an optical element of the optical instrument, as claimed in claim 1, wherein said optical element comprises a multiple holographic lens.

3. A mounting fixture for an optical instrument providing for a precise mounting and positional adjustment therein of an optical element of the optical instrument, as claimed in claim 2, wherein said means for fixedly securing the track plate includes at least one β yaw adjustment set screw extending from said base member to said cradle.

4. A mounting fixture for an optical instrument providing for a precise mounting and positional adjustment therein of an optical element of the optical instrument, as claimed in claim 3, wherein said track plate is rotationally mounted on said base member by an inner central bearing and also by an outer circular bearing.

5. A mounting fixture for an optical instrument providing for a precise mounting and positional adjustment therein of an optical element of the optical instrument, as claimed in claim 4, wherein said means for fixedly securing the cradle includes at least one θ roll adjustment set screw extending from said track plate to said cradle.

6. A mounting fixture for an optical instrument providing for a precise mounting and positional adjustment therein of an optical element of the optical instrument, as claimed in claim 5, wherein said cradle is rotationally mounted on said track plate by a plurality of roller bearing assemblies, at least two of which move along a θ roll adjustment track on said track plate.

7. A mounting fixture for an optical instrument providing for a precise mounting and positional adjustment therein of an optical element of the optical instrument, as claimed in claim 6, wherein said means for fixedly securing the optical element holder in a selected rotational position includes at least one γ pitch adjustment set screw extending from said cradle to said optical element holder, and wherein said means for fixedly securing the optical element holder in a selected x translational position includes at least one x translational adjustment set screw extending from said cradle to said optical element holder.

8. A mounting fixture for an optical instrument providing for a precise mounting and positional adjustment therein of an optical element of the optical instrument, as claimed in claim 7, wherein said means for fixedly securing the optical element holder includes a rotatable and translational pin mounted on one side of said optical element holder extending to the cradle, and a rotatable and translational adjustment set screw on a second side of said optical element holder extending from said cradle to said optical element holder.

9. A mounting fixture for an optical instrument providing for a precise mounting and positional adjustment therein of an optical element of the optical instrument, as claimed in claim 8, wherein said means for fixedly securing the optical element in a selected y translational position includes at least one y translational adjustment set screw extending from said optical element to said optical element holder.

10. A mounting fixture for an optical instrument providing for a precise mounting and positional adjustment therein of an optical element of the optical instrument, as claimed in claim 1, wherein said means for fixedly securing the track plate includes at least one $\beta$ yaw adjustment set screw extending from said base member to said cradle.

11. A mounting fixture for an optical instrument providing for a precise mounting and positional adjustment therein of an optical element of the optical instrument, as claimed in claim 1, wherein said track plate is rotationally mounted on said base member by an inner central bearing and also by an outer circular bearing.

12. A mounting fixture for an optical instrument providing for a precise mounting and positional adjustment therein of an optical element of the optical instrument, as claimed in claim 1, wherein said means for fixedly securing the cradle includes at least one $\theta$ roll adjustment set screw extending from said track plate to said cradle.

13. A mounting fixture for an optical instrument providing for a precise mounting and positional adjustment therein of an optical element of the optical instrument, as claimed in claim 1, wherein said cradle is rotationally mounted on said track plate by a plurality of roller bearing assemblies, at least two of which move along a $\theta$ roll adjustment track on said track plate.

14. A mounting fixture for an optical instrument providing for a precise mounting and positional adjustment therein of an optical element of the optical instrument, as claimed in claim 1, wherein said means for fixedly securing the optical element holder in a selected rotational position includes at least one $\gamma$ pitch adjustment set screw extending from said cradle to said optical element holder, and wherein said means for fixedly securing the optical element holder in a selected x translational position includes at least one x translational adjustment set screw extending from said cradle to said optical element holder.

15. A mounting fixture for an optical instrument providing for a precise mounting and positional adjustment therein of an optical element of the optical instrument, as claimed in claim 1, wherein said means for fixedly securing the optical element holder includes a rotatable and translational pin mounted on one side of said optical element holder extending to the cradle, and a rotatable and translational set adjustment screw on a second side of said optical element holder extending from said cradle to said optical element holder.

16. A mounting fixture for an optical instrument providing for a precise mounting and positional adjustment therein of an optical element of the optical instrument, as claimed in claim 1, wherein said means for fixedly securing the optical element in a selected y translational position includes at least one y translational adjustment set screw extending from said optical element to said optical element holder.

* * * * *